United States Patent

Webb et al.

[15] 3,653,038

[45] Mar. 28, 1972

[54] CAPACITIVE ELECTRIC SIGNAL DEVICE AND KEYBOARD USING SAID DEVICE

[72] Inventors: James R. Webb; Richard C. Webb, both of Boulder, Colo.

[73] Assignee: United Bank of Denver National Association, Denver, Colo.

[22] Filed: Feb. 20, 1970

[21] Appl. No.: 13,091

[52] U.S. Cl. ............................340/365, 179/90 K, 235/145, 307/88 ET, 178/DIG. 10, 179/100.41 B, 197/98

[51] Int. Cl. ............................G08c 5/00

[58] Field of Search ....................340/365, 173 SP; 179/90 K, 179/100.41 B; 235/145, 146; 178/79, 81, DIG. 10, 17 C; 197/98; 307/88 ET; 200/5 E, 159 B; 317/249

[56] References Cited

UNITED STATES PATENTS

| | | | |
|---|---|---|---|
| 3,293,640 | 12/1966 | Chalfin et al. | 340/365 |
| 3,210,484 | 10/1965 | Dorsey | 179/90 K |
| 3,159,820 | 12/1964 | Oden | 340/173 SP |

OTHER PUBLICATIONS

IBM Technical Disclosure, Vol. 12, No. 7, December 1969, p. 1053, " Contactless Switch," Moore et al.

IBM Technical Disclosure, Vol. 12, No. 8, January 1970, p. 1166, " Contactless Keyboard," McDowell et al.

*Primary Examiner*—John W. Caldwell
*Assistant Examiner*—Robert J. Mooney
*Attorney*—Sheridan, Ross & Burton

[57] ABSTRACT

This disclosure describes electric signal devices of a capacitive nature. A metallic target which may or may not have a permanently charged dielectric material mounted on its upper surface is located beneath a semi-hemispherical dome spring. Located above the dome spring is a push button or key element which, when depressed, changes the separation distance between the dome spring and the target in a "snap" action manner. This action causes a rapid decrease in the voltage between the target and the dome spring which decrease is in the form of a signal pulse. This disclosure also describes splitting the target into two or more segments and connecting the segments to a plurality of electrical signal devices in a matrix arrangement. The keys or push button elements are mounted in a keyboard arrangement such that when individual keys are depressed coded symbols which represent information about the depressed key are generated. The coded symbols are suitable for direct entry into digital data systems, displays and/or computers.

30 Claims, 10 Drawing Figures

INVENTORS
RICHARD C. WEBB
JAMES R. WEBB

BY Sheridan, Ross & Burton
ATTORNEYS

INVENTORS

RICHARD C. WEBB

JAMES R. WEBB

BY Sheridan, Ross & Burton

ATTORNEYS

INVENTORS

RICHARD C. WEBB

JAMES R. WEBB

BY Sheridan, Ross & Burton

ATTORNEYS

CAPACITIVE ELECTRIC SIGNAL DEVICE AND KEYBOARD USING SAID DEVICE

BACKGROUND OF THE INVENTION

This invention is directed to electric signal devices and more particularly to electrical signal devices or non-contacting switches of a capacitive nature. In addition, this invention is directed to the use of such capacitive electric signal devices or switches in keyboard arrangements, including alpha-numeric keyboard arrangements, to cause the generation of binary signals that are suitable for direct entry into digital data transmission systems, displays and/or computers.

With the advent of the widespread use of electronic data processing systems (commonly called computers), there has grown a need for a simpler, smaller, low cost and generally more satisfactory keyboard data entry system. Such systems form the man/machine interface in a data processing system. That is, the operator of the machine depresses keys on the keyboard to form binary or coded binary signals which are fed into the data processing machine. Currently, such interface equipment is formed by such devices as teletype machines, card keypunch units, electric typewriters, adding machines, and the like. However, these devices are not entirely satisfactory for various reasons.

The most common prior art apparatus for generating data from an array of keys is an electric switch that closes when a key is depressed. That is, each time a key in the keyboard array is depressed an associated switch closes. Closure of the switch causes a coded signal to be generated which uniquely defines the key that was depressed. The data bit pattern thus generated is fed into the data processing system. While apparatus of this nature is generally satisfactory when new, it becomes increasingly less satisfactory with age. More specifically, switch contacts, as they wear, produce a more or less erratic circuit closure, generate contact bounce, and the like. These developments which occur primarily near the end of life of the switch (but which can occur at any time during the life of the switch), have an undesirable effect on the accuracy of the information generated. That is, these undesirable developments often cause miscoding of the information being fed into the data processing system. Another disadvantage of contact switch systems is arcing. This undesirable phenomenon occurs to some extent in all switches and is always objectionable. It is primarily objectionable as a source of electrical noise. In addition, it is occasionally objectionable because it creates a hazard when the switch is utilized in an area that contains explosive gases.

It will be appreciated by those who have used them that prior art keyboards generally have several other undesirable features. For example, many keyboards are thick and not compact, and have a relatively high profile, thus making them inconvenient and tiresome to reach. In addition, the action of the keys is frequently less rapid than desirable. Moreover, many require the release of preceeding keys before a new key may be depressed, i.e., such keyboards do not accept "rolling" operation, thereby making them slow and tedious. Furthermore, "simultaneous" key depressions, may not be detectable. Often the keys are not rugged and not sealed, so as to be immune to dust and dirt. Some keyboard systems are adversely subject to changes in temperature. Further, many systems use more than a minimal amount of power, making them unuseful in battery operated environments. Another most important factor is that many prior art keyboards are expensive to manufacture and are not readily mass produceable.

It will be appreciated by those skilled in the art and others that there are still further problems with many prior art keyboards. Some of these will become apparent from the following description of the invention, however, the problems already mentioned are the primary problems of prior art keyboards, and it is a general object of this invention to overcome these problems.

It is also an object of this invention to provide a new and improved keyboard suitable for direct generation of digital coded information.

It is a further object of this invention to provide a new and improved multikey keyboard that is particularly inexpensive to manufacture and mass produce and includes, touch feedback, positive snap action keys that are not teasible yet are rugged, non-contacting, and sealed so as to be immune from dust, dirt or a moist enviornment.

It is a still further object of this invention to provide a new and improved keyboard that operates uniformly over a wide range of temperatures, yet delivers error free digital data signals suitable for direct application to a digital data processing system.

It will be appreciated from the foregoing description that the invention contemplates the development of a new switch that can be used singly as well as part of a group assembly (keyboard). Therefore, it is a still further object of this invention to provide a new and improved non-contacting snap action switch.

SUMMARY OF THE INVENTION

In accordance with a principle of this invention, a capacitive electric signal device which may be used as a switch in combination with a keyboard is provided. The basic structure comprises a metallic target which forms one "plate" of the capacitor. Located near the target and separated therefrom by air is a dome spring. The dome spring forms the other plate of the capacitor. Located adjacent the dome spring and axially aligned therewith is a depressable button or key. When a suitable amount of pressure, applied either slowly or rapidly, reaches the key, the dome spring snaps from its dome configuration and the capacitance between the two "plates" changes. This change is arranged to cause the generation of an electric signal. When the key is released, the dome snaps back to its previous configuration and generates a second electric signal opposite in the polarity to the first signal.

In accordance with another principle of this invention, the near surface of the target is covered with a permanently charged dielectric material, commonly referred to as an "electret." Such materials have been formed of waxes, resins, fluorocarbon films and some titanate ceramics. They have recently been used in self-polarized capacitor microphones to eliminate the need for an external, high voltage power supply.

In accordance with a further principle of this invention, all targets of a plurality of signal devices of the type previously described are split into plural segments. The segments are connected in an $x$–$y$ matrix arrangmeent so that each time a particular key is depressed a signal is generated along one $x$ line and one $y$ line.

In accordance with yet another principle of this invention, the $x$ lines and the $y$ lines are each connected to encoders which encode the output from the matrix in a manner that is suitable for direct application to digital data processing systems. Further, suitable means are provided for detecting the simultaneous depression of more than one key and generating an error signal when this situation occurs. In addition, means are provided for generating a strobe or gate signal each time a key is depressed.

In accordance with an alternate principle of this invention, the target is split into a plurality of segments so that a plurality of signals are generated upon the depression of each individual key.

It will be appreciated from the foregoing description that the invention provides a capacitive electric signal device that is, per se, unique. The device can be used to replace a conventional contact switch in some environments. In addition, the electrical signal device meets the above noted objects of the invention in that it is not teasable and has a light, positive snap action. Moreover, the electrical signal device consumes a very small amount of power, and is immune to dust and dirt or a moist environment when it is suitably enclosed. Further, the electric signal device is rugged, and non-contacting, thereby eliminating arcing.

It will also be appreciated from the foregoing description that the capacitive electric signal device of the invention can be utilized in a keyboard environment to generate binary signals suitable for application to a digital data processing system. Moreover, by splitting the target plate of the electric signal device, the invention can be utilized in matrix form to create matrix signals which are particularly convenient for application to a digital data processing device. Further, the invention meets many of the objects of an "ideal" keyboard by providing a thin, compact, low profile, convenient signal source which has a plurality of light, positive snap-action keys that are not teasable. The keys can accept rolling operation, if desired. Moreover, means are provided for detecting and indicating errors produced by simultaneous key key depressions.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

Figure 1:
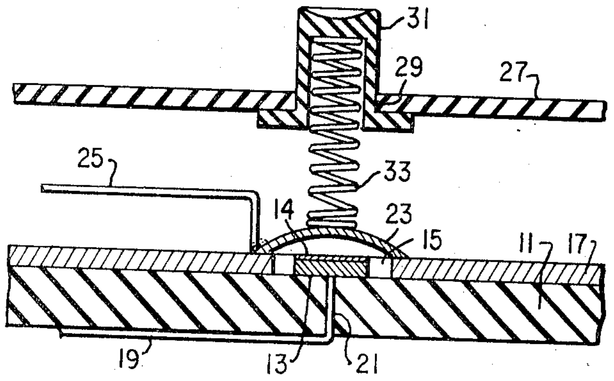
FIG. 1 is a cross sectional diagram of an electrical signal device (capacitor switch) made in accordance with the invention.

Prior to describing the preferred embodiments of the invention, the following description of the theory of operation of the electric signal device or capacitor switch of the invention is provided.

The principle of signal generation of the capacitive electric signal device of the invention is based upon the well known relationship among the three parameters involved in expressing the condition of a charged capacitor, namely:

$$CV=Q$$

where:

$Q$ is the charge in coulombs on the capacitor;

$V$ is the voltage in volts existing at the terminals of the capacitor; and, $C$ is the capacitance value in farads of the capacitor.

It is also well known that the value of the capacitor depends upon the physical dimensions of the capacitor plates, their separation and the properties of the dielectric material separating the plates. Such a value can be mathematically determined by the following equation:

$$C=kA/3.6\pi d$$

where:

$A$ represents the area of one plate in square centimeters;

$k$ represents the dielectric constant of the insulating material between the plates; and, $d$ represents the distance between the plates in centimeters.

In an environment where the charge $Q$ is regarded as essentially constant, i.e. a short interval of time by comparison with the natural leakage time constant brought about by the resistance loading of the sensing circuit, the parameters $C$ and $V$ occupy a complementary relationship. That is, as one value increases, the other value decreases. Thus, if the value of $C$ is increased due to a reduction of the spacing between the plates, the terminal voltage $V$ is changed in magnitude by a similar amount so as to maintain the $CV$ product constant. It is this basic concept upon which the invention operates. The desired change is created by depressing a key. And, the voltage change represents an electrical signal that is suitable for introduction into an encoding logic circuit resulting in a signal which uniquely identifies the depressed key in binary or other suitable language.

The foregoing description has outlined the ideal constant $Q$ situation which in accordance with the teachings of this invention, can only be obtained through the use of some form of a mechanical trigger operable by keys or other suitable depression means. The keys initiate an abrupt displacement of a diaphragm located opposite a selected capacitor target plate each time a key is depressed no matter how gently. As set forth in the following description, the preferred form of a mechanism which gives this desired "snap" action is created by shaping the diaphram into a dome spring. The dome spring is a small section of a thin spherical shell of spring metal. A compressible coupling medium such as a coil spring or piece of resilient foam material, for example, is located above the dome spring to couple the dome spring to the bottom of the key or button. As finger pressure is applied to the key, the pressure is transmitted via the intermediate compressible coupling medium to the top or sides of the dome spring. The back pressure generated by the dome spring eventually is overcome and the spring "snaps" through or collapses abruptly into a slightly inverted arched shape. This action reduces the air spacing between the two plates of the capacitor, sharply increasing its value since the dome spring forms the other plate of the capacitor. Inasmuch as the "snap" action of the dome spring occurs rapidly and at a rate determined only by the design of the spring and its coupling medium, the spring action thus defines a discrete interval of time. It is now only necessary to arrange the time constant of the sensing circuit to be long in comparison with the spring time interval to achieve the constant $Q$ environment.

It will be appreciated from the foregoing brief description of the basic operation of the invention that a non-contacting electric signal device having positive snap action is provided. The device is non-teasable, provides finger touch feedback and accepts "rolling" operation since a signal is generated only by the rapid increase in capacitance. Further, by a suitable design of the key-capacitor switch combination, a thin low profile can be provided. In addition, a multi-key signal device that is rugged, consumes low power and is readily manufactured at low cost using photographic techniques and a sandwich-type construction, can be provided. Moreover, the device can be potted so as to be better immune to environmental conditions.

Turning now to a description of the perferred embodiments of the invention, FIG. 1 illustrates one form of a capacitive electric signal device formed in accordance with the invention. The capacitive electrical signal device or capacitor switch illustrated in FIG. 1 comprises a flat base substrate 11 which may be, for example, a conventional glass epoxy printed circuit board substrate clad with copper on both sides to allow photo formation of the various metallic regions herein described. More specifically, the copper on the upper surface of the base substrate 11 is etched in any suitable manner to form a generally circular metallic target region 13. Thereafter, the entire upper surface, except for an aperture 15 surrounding the target region 13 is coated with a dielectric film. Hence, one dielectric film 14 is formed over the target region and a second 17 is formed over the surrounding base substrate. In addition, a printed circuit connector region 19 is formed in the lower surface of the base substrate and is connected to the target region 13 via a suitable metallic connector 21.

The outer edge of a dome spring 23, located above the target region 13, and spaced therefrom by air, rests on the dielectric coating 17. In one practical embodiment of the invention the dome spring was formed of a circular section of approximately one half inch in diameter of a spherical shell having a radius of approximately 2 inches. The thickness of the spring metal shell was between 0.002 and 0.004 inches. The dome spring is connected to an external circuit via a lead 25. A key guide plate 27 is located above and parallel to the base substrate 11. An aperture 29 is located in the key guide plate 27 in line with the dome spring 23 and the target 13. The aperture 29 holds a push button key element 31. The key element is attached to the center of the dome spring 23 via a coil spring 33.

In accordance with the foregoing theory of operation, when the key element 31 is depressed, the coil spring 33 applies pressure to the dome spring 23. When a suitable amount of pressure is applied, the dome spring "snaps thru." This action varies the capacitance between the dome spring 23 and the target region 13. If the capacitor contains a suitable voltage charge when this action occurs, an electric signal is generated which is detected and used by a suitable electronic system, such as that hereinafter described.

While the structure illustrated in FIG. 1 is suitable for use in some environments, it can possess certain disadvantages. Specifically, it has been found experimentally that dielectric polarization occurs with many dielectric films and that over a period of time the film tends to slowly develop a charge on both surfaces. This action causes the upper surface of the film (i.e., the upper surface of the target 13) to take on the same electric potential as the dome spring 23. Thus, when the dome spring is collapsed, the capacitance between it and the metal target region 13 remains the same and no signal is generated. If this situation occurs, it can be easily overcome by reversing the polarity of the charging voltage applied to the dome spring and the target plate 13; or by removing the dielectric film 14. However, these solutions are slightly impracticable. A somewhat better solution is to use a slightly leaky or somewhat imperfect dielectric which entirely aleviates the problem.

Figure 2:
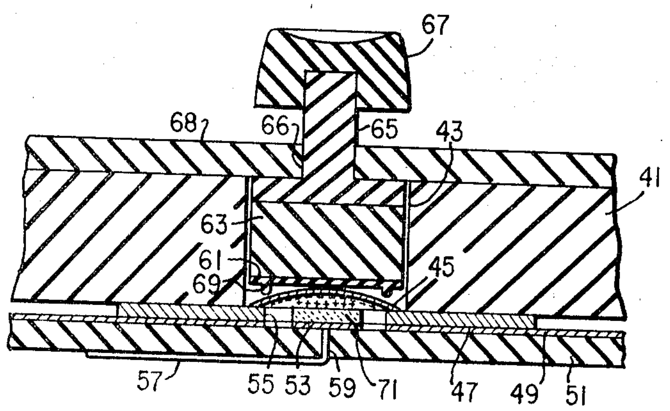
FIG. 2 is an alternate embodiment of an electrical signal device (capacitor switch) made in accordance with the invention.

While the use of a dielectric film having a controlled leakage will solve the foregoing pboblems, the structure illustrated in FIG. 2 provides an even better solution. More specifically, the FIG. 2 structure turns the polarizing charge on the dielectric film into a desirable feature by selecting a film that has already had a rather large electric charge frozen into it much like a magnet retains its magnetism. Such films are well known in the electrical arts and have been given the name "electret." Electrets have been formed out of waxes, resins, fluorocarbon and other films and even titanate ceramics. Recently, capacitor microphones using such permanently charged films to provide self-excitation and, thereby, eliminate the need for an external high voltage power supply have been developed. It is this type of film that is used by the invention.

Turning now to a specific description of the embodiment of the electrical signal device or capacitor switch illustrated in FIG. 2, a central support plate 41 having a cylindrical aperture 43 and formed of an insulating material is illustrated. A dome spring 45 rests on a conductive metal shim or washer 47 that surrounds the aperture 43 on the lower surface of the center support plate 41. The dome spring 45 arches upward into the aperture 43. The conductive metal shim 47 rests upon the upper copper layer 49 of an epoxy circuit board 51. A circular etched metal target region 53 is located beneath the aperture 43 and is separated from the major portion of the upper copper layer 49 of the glass epoxy circuit board 51 by a separation 55. Preferably, the target region 53 is roughly one-half inch in diameter and the gap between the isolated circular target and the grounded surrounding material formed of the metal shim 47 and the upper copper layer 49 is about one thirty-seconds of an inch. The target region 53 is connected to an external circuit via an etched conductor 57 formed in the lower copper layer of the epoxy circuit board 51. The etched conductor 57 as well as the etched portions of the upper copper region may be formed in any conventional manner, such as by photographic-etching techniques, for example. The etched conductor 57 is connected to the upper target plate via a suitable connector 59 passing through the epoxy circuit board 51.

It will be appreciated from the foregoing description that a capacitor structure is formed between the grounded dome spring 45 and the isolated target plate 53. Located above the dome spring in the aperture 43 is a pressure plate. Located above the pressure plate 61 is a foam pad or springable member 63. Further, located above the springable member 63 is a cylindrical coupling element 65 which is illustrated as having an inverted T shape, in cross section. The "head" of the coupling element 65 fits in the aperture 43 above the springable member 63 and the "leg" of the coupling element 65 passes through a smaller aperture 66 in a cover plate 68. The leg of the coupling element 65 is attached to a button cap or key 67. Preferably, the pressure plate 61 has three downwardly projecting elements 69 that are symmetrically spaced so as to contact the dome spring near its outer edge. In this way, the center of the dome is free to execute the greatest possible snap-thru action. The dome actually reverses its curvature and extends down toward the target plate after snap-action occurs. More specifically, when the button cap or key 67 is depressed, pressure is transmitted to the spring dome 45 via the connecting elements. This pressure causes the dome spring 45 to abruptly reverse in curvature thereby varying the capacitance between the target plate 53 and the dome spring 45 very quickly.

Mounted on the target region 53 on the opposite side from the epoxy substrate is a permanently charged dielectric layer 71. Preferably, the charged dielectric layer is of the same size in diameter as the circular target region 53, however, it does not have to be the same diameter. Because of this location a charge is exposed to the moveable dome spring 45, on one side thereof. As previously stated, this charged dielectric layer is normally referred to as an electret.

It is the use of the electret material which now provides the electric field necessary for the operation of the device. More specifically, assuming that the dielectric surface toward the dome spring carries a positive charge, then the charge on the facing dome surface and the target plate is necessarily negative since an electrical path is formed via conductor 57 to a resistor (not shown in FIG. 2) to ground. This circuit leaves the air space between the upper surface of the electret 71 and the lower surface of the dome spring 45 as the charged capacitor, previously described with respect to the basic operation of the invention.

When the capacitance between the dome spring 45 and the upper surface of the electret material increases very rapidly as the dome spring snaps thru and takes a position very close to the surface of the electret, the voltage extending across the capacitance necessarily falls to a smaller value, thereby giving rise to a negative going electrical signal voltage carried from the target plate 53 via conductor 57 to an external sensing circuit. In this manner, the key depression may be sensed by a connected electronic circuit.

Figure 3:
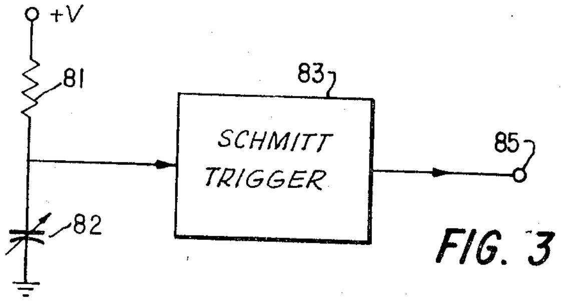
FIG. 3 is a schematic diagram illustrating a means for detecting the output from signal devices of the type illustrated in FIGS. 1 and 2.

FIG. 3 illustrates a system for detecting the output of a single key and comprises a resistor 81 connected at one end to a voltage source designated +V. The other end of the resistor is connected through a capacitor switch 82 of the type illustrated in FIG. 1 to ground. A similar arrangement would be used for a capacitor switch of the type illustrated in FIG. 2 except that the +V and ground connections would be revised. The junction between the capacitor switch 82 and the resistor 81 is connected to the input of a Schmitt trigger circuit 83. The output from the Schmitt trigger circuit 83 is defined as terminal 85. When a signal is generated by the action of a capacitor switch, a pulse is created by the Schmitt trigger 83 at terminal 85 in accordance with the general principles of operation of a Schmitt trigger circuit. Such a pulse occurs for each key depression.

Figure 4A:
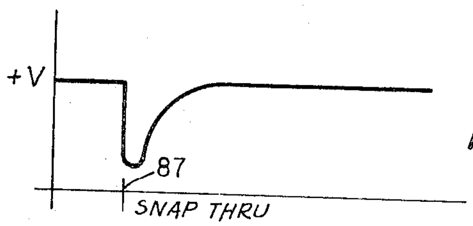
FIGS. 4A and 4B are waveform diagrams illustrating the signal generated when a key is depressed and when a key is released for signal devices of the type illustrated in FIGS. 1 and 2.

Fig 4A illustrates the waveform of the signal sensed by the Schmitt trigger circuit 83 each time a dome spring "snap thru" occurs. At the snap thru point 87, a rapid increase in capacitance occurs which causes a rapid decrease in voltage. It is this rapid decrease in voltage that is sensed by the Schmitt trigger circuit 83 and causes it to generate a pulse. When the key is released at point 88 of FIG. 4B, the dome snaps back, and a signal starts in the positive direction as illustrated.

Figure 4B:
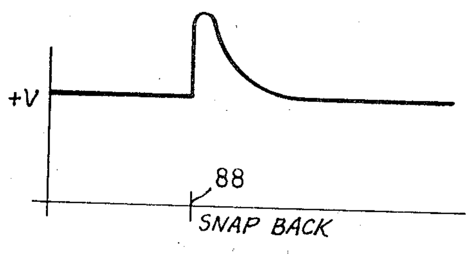

It will be appreciated by those skilled in the art and others that either of the electrical signals illustrated in FIGS. 4A or 4B can be used to generate data pulses. In its least complicated form, a single key assembly of the type illustrated in FIGS. 1 or FIG. 2 delivering its signal to suitable Schmitt trigger constitutes a signal device. A plurality of such key assemblies each connected to a Schmitt trigger circuit constitutes a keyboard with a single line output. While such a keyboard is suitable for use in some environments, for the sake of economy and construction, the invention also contemplates means for achieving a coded output through the common use of Schmitt trigger circuits by a large number of key assemblies, as hereinafter described.

Figure 5:
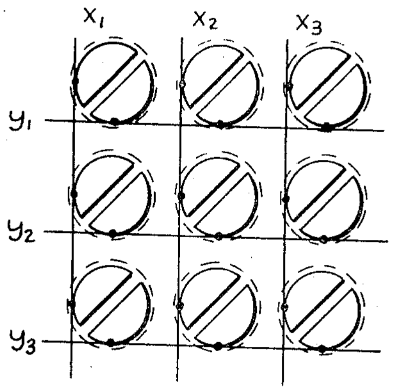
FIG. 5 is a pictorial diagram illustrating splitting the target plate of electrical signal devices of the type as illustrated in FIGS. 1 and 2 into two segments and connecting a plurality of said split targets in a matrix arrangement.

FIG. 5 illustrates one means of combining key assemblies to achieve a coded output. Specifically, a dielectric keyboard utilizing signal devices of the type illustrated in FIGS. 1 or 2 has two capacitor target regions located under each spring dome. Such an arrangement is created by splitting the circular target into segments, as illustrated in FIG. 5. The bifurcated target segments are then electrically connected as elements of an $x$–$y$ matrix, one-half of each target being connected to one of the $x$ lines and the other to one of the $y$ lines. Thus, each target can be described as having an address in the array, $x_n$, $y_n$.

Figure 6:
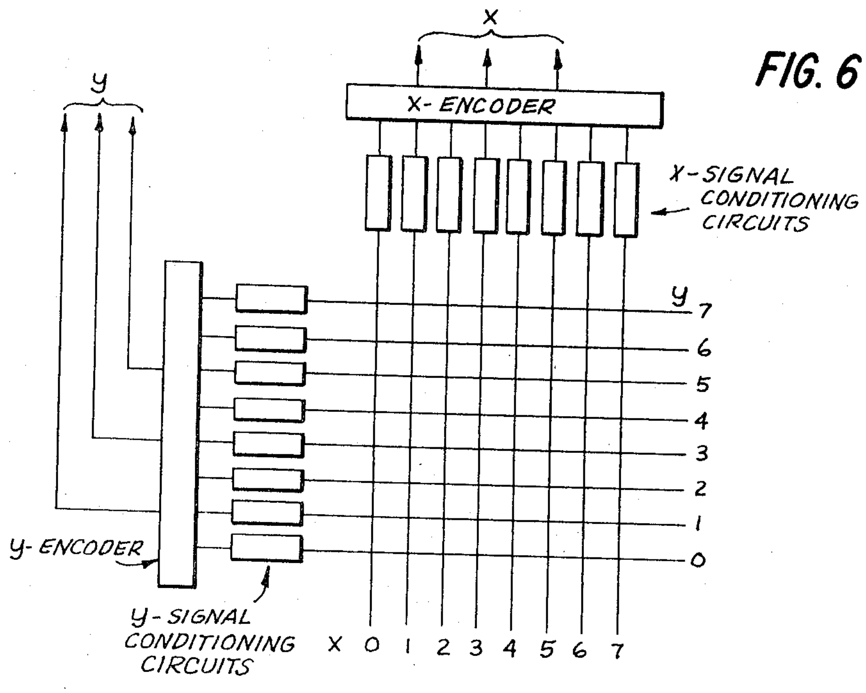
FIG. 6 is a schematic diagram of a matrix of the type illustrated in FIG. 5 connected to signal conditioning and encoding circuits.

Even though the targets of a keyboard may not physically line up conveniently in the rows and columns illustrated in FIG. 5, it is to be understood that they can be electrically so located for purposes of assigning coded values to their output signals. For purposes of illustration, consider a keyboard of 64 keys generally arrayed as illustrated in FIG. 5, or at least electrically so arrayed. This number (64) of language and numeric symbols, punctuation, and the like can be defined by a six bit binary code word or "byte" ranging from 000,000 or $x_n$, $y_n$ to 111, 111. More specifically, the values of $x_n$ and $y_n$ representing any given key can be expressed in a pure binary code. It will be appreciated by those skilled in the art and others that an 8 by 8 matrix also defines 64 elements, there being 0 through 7, $x$ lines and 0 through 7, $y$ lines. Because of this arrangement, only 16 Schmitt trigger circuits and associated pulse stretchers (the combination hereinafter referred to as signal conditioners) are required to service the 64 key elements. Such an arrangement is illustrated in FIG. 6. More specifically, one set of eight signal conditioners are associated with the $x$ lines and are encoded by a single $x$ encoder as the first three bits of the keyboard output code word. A second set of eight signal conditioners are associated with the $y$ lines and are encoded by a single $y$ encoder into the second three bits.

Figure 7:
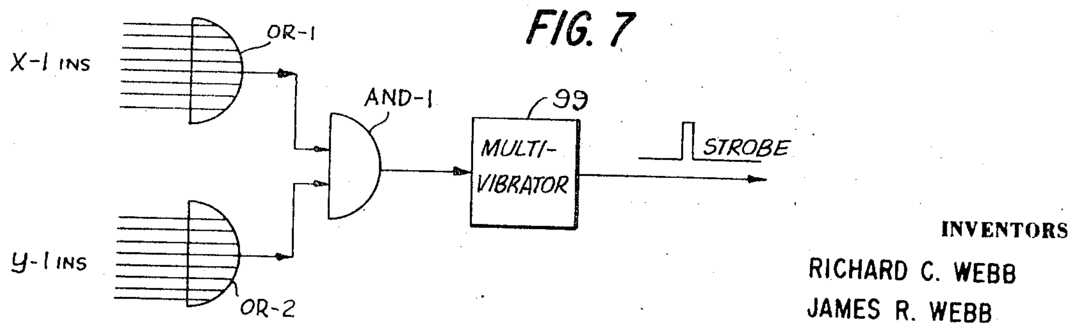
FIG. 7 is a block diagram illustrating a system for sensing when a key is depressed and for generating a strobe or gate signal for each depression.

This invention also provides means for generating a strobe or gate signal each time a gate is depressed so that equipment receiving data from the keyboard is notified each time a new signal is presented. A system formed in accordance with the invention for generating such strobe signals is illustrated in FIG. 7. All of the $x$ line signals of the matrix are applied to the inputs of a first-eight input OR gate designated OR–1 and all of the $y$ line signals are applied to the inputs of a second-eight input OR gate designated OR–2. The outputs from the first and second OR gates are applied to the inputs of a two input AND gate designated AND–1. Hence, both an $x$ signal and a $y$ signal must be generated simultaneously before the AND gate can generate an output signal. The output from the AND gate is applied to the input of a monostable multivibrator 99. The monostable multivibrator generates a strobe pulse output each time AND–1 generates a signal. Thus, each time a key is depressed and both $x$ and $y$ signals are generated, a strobe signal is generated. The length of the strobe signal is, of course, determined by the time constant setting of the multivibrator. If either an $x$ or a $y$ signal, but not both, is generated, a strobe signal is not generated. Hence, by using the strobe signal to gate the outputs from the $x$ and $y$ encoders, spurious outputs are prevented.

Figure 8:
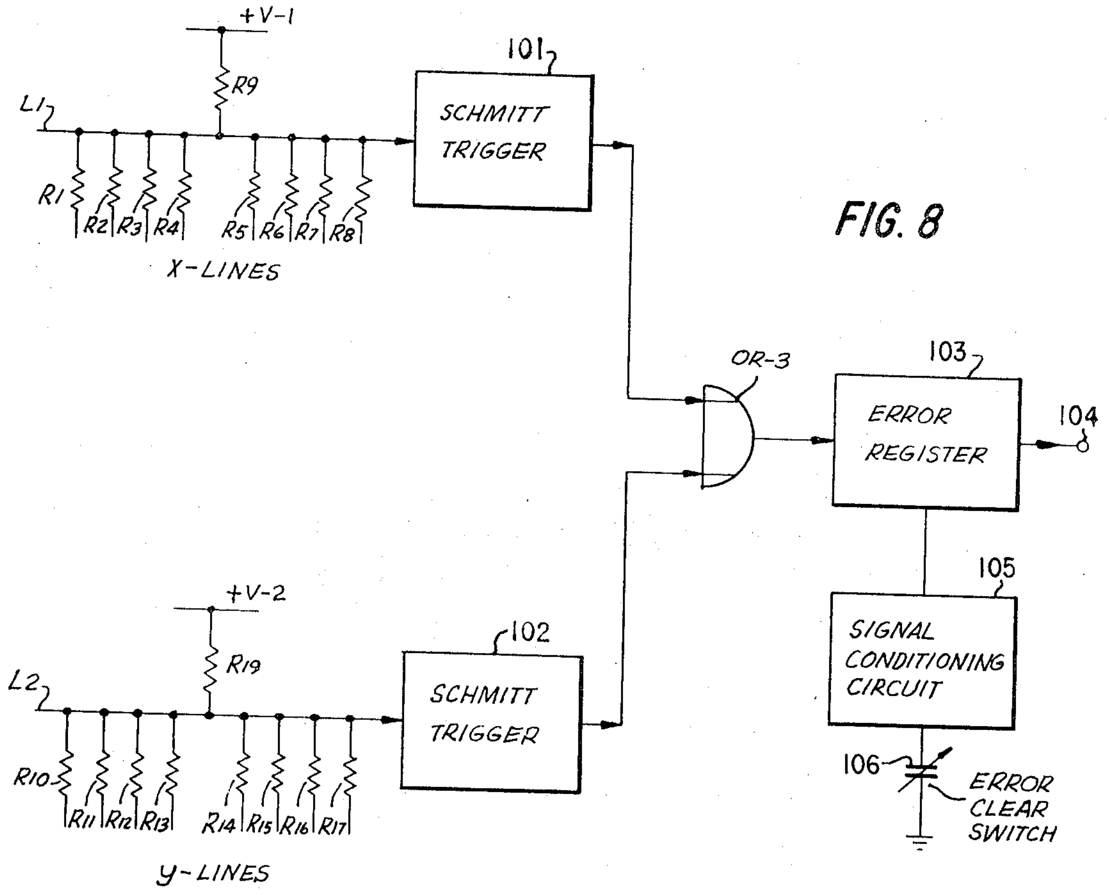
FIG. 8 is a block diagram of a system for detecting simultaneous key depressions; and, FIG. 9 is a pictorial diagram illustrating the target of electric signal devices of the type illustrated in FIGS. 1 and 2 split into more than two segments.

It will also be appreciated that it is desirable to provide a system for detecting the simultaneous operation of two keys because such simultaneous operation could generate an erroneous output code. A system for detecting such simultaneous operation is illustrated in FIG. 8. Each $x$ matrix line is connected to a common line designated L1 via resistors R1–R8. L1 is also connected to a voltage source designated +V–1 via resistor R9. Similarly, all of the $y$ matrix lines are connected to a common line designated L2 via resistors R10–R17. In addition, L2 is connected to a voltage source designated +V–2 via resistor R19. L1 is connected to the input of a first Schmitt trigger 101 and L2 is connected to the input of a second Schmitt trigger 102. The outputs from the two Schmitt triggers 101 and 102 are connected to the inputs of a two input OR gate designated OR–3. The output of OR–3 is connected to the input of an error register 103. The error register has one output connected to an output terminal 104 and a second output connected to a signal conditioning circuit 105. The output from the signal conditioning circuit is applied through an error clear switch 106 to ground. Preferably, the error register is a simple flip-flop which generates an indicator signal at output terminal 104 that inhibits the further use of the keyboard until the error clear switch is operated to reset the error register 103.

In operation, when more than one $x$ line or more than one $y$ line receives a signal due to the simultaneous operation of two keys, one or both of the Schmitt triggers 101 and 102 generate an output signal. This signal is applied via OR–3 to the error register 103 thereby causing the error register to generate an output signal of the type previously described. A single $x$ signal or a single $y$ signal is insufficient to trigger the Schmitt triggers 101 and 102. In this manner, only the simultaneous operation of two keys is detected and used to inhibit further keyboard operation.

Figure 9:
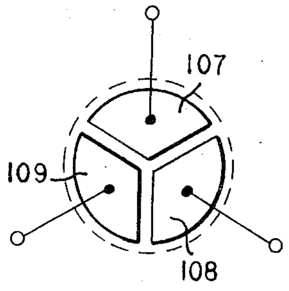

It will be appreciated by those skilled in the art and others than the invention does not have to be limited to a two segment split target of the type illustrated in FIG. 5. In this regard, FIG. 9 illustrates a three segment target having segments 107, 108 and 109. These segments are all located beneath the dome spring of the signal devices previously described. Hence, each time the dome spring is depressed, in the manner previously described, three output signals are generated. Alternatively, four or more outputs signals, depending upon the size of the target involved and the number of segments formed, could be generated.

It will be appreciated that a three piece target permits direct encoding of a three digit matrix. For example, the touch tone telephone dial system commonly in use uses three frequency components. The lower frequency is a composite of five separate frequencies, the middle frequency is a composite of five separate frequencies, and the upper frequency is a composite of four separate frequencies. Thus, the signal key of the invention, can be used to trigger a tone combining all or some of these frequencies.

It will be appreciated from the foregoing description that a novel capacitor electric signal device as well as a matrix utilizing the device to generate a binary code is provided. It will also be appreciated that the invention can be practiced otherwise than as specifically described herein. For example, the sandwich layout of the switch structure can be modified in accordance with a particular use of the invention and the particular key structure involved. Moreover as previously stated, the target can be split into a plurality of separate regions, also depending upon the use to which the invention is put.

Moreover, while the invention prefers the use of an electret material a simple dielectric suitably isolated from the surrounding components can be used, if desired.

What is claimed is:

1. An electric signal device comprising:
 a metallic target mounted in a fixed position;
 a metallic dome spring mounted adjacent one side of said metallic target;
 means providing a potential between said target and said spring, the distance between said dome spring and said target being abruptly decreasable to change the capacitance therebetween when pressure is applied to a side of said dome spring opposite said target to provide an output signal;
 key means for applying pressure to the opposite side of said dome spring; and
 means for connecting said target and said dome spring to an electrical circuit responsive to said output signal.

2. An electric signal device as claimed in claim 1 wherein said potential providing means includes an electret material attached to said one side of said metallic target.

3. An electric signal device as claimed in claim 1 including a substrate upon which said metallic target is fixedly mounted.

4. An electric signal device as claimed in claim 1 wherein said key means for applying pressure to the upper surface of said dome spring comprises a key button mounted on the other side of said dome spring opposite said metallic target and a compression means mounted between said key button and said dome spring for transferring pressure from said key button to said dome spring.

5. An electric signal device as claimed in claim 3 wherein said substrate is copper clad on both sides and etched in a predetermined manner, a portion of the copper remaining after etching forming said metallic target; and, including a metallic washer mounted about said target upon which said dome spring is mounted, said metallic washer being electrically connected to a further portion of said copper remaining after etching.

6. An electric signal device as claimed in claim 4 wherein said compression means includes a compressable pad and a pressure plate having a plurality of elements that impinge on one surface of said dome spring.

7. An electric signal device as claimed in claim 1 wherein said one side of said target is split into a predetermined number of segments facing said dome spring.

8. An electric signal device as claimed in claim 7 wherein said plurality of segments equals two in number.

9. An electric signal device as claimed in claim 2 wherein said one side of said target is split into a predetermined number of segments facing said dome spring.

10. An electric signal device as claimed in claim 9 wherein said plurality of segments equals two in number.

11. An electric signal device as claimed in claim 3 wherein said substrate is copper clad on both sides and etched in a predetermined manner, a portion of the copper remaining after etching forming said metallic target.

12. An keyboard matrix comprising:
 a plurality of electric signal devices, each of said electric signal devices including a dome spring, a metallic target and key means for applying pressure to said dome spring to change the position of said dome spring, said dome spring and said metallic target being mounted so that when the position of said dome spring is changed, the distance between said dome spring and said metallic target is reduced in a rapid manner, said metallic target being split into at least two segments; and,
 means for connecting the segments of said metallic targets of said plurality of electric signal devices into a matrix arrangement.

13. A keyboard matrix as claimed in claim 12 wherein said matrix arrangement is an $x$–$y$ matrix having a plurality of $x$ and $y$ lines.

14. A keyboard matrix as claimed in claim 13 including a plurality of signal conditioning circuits, one signal conditioning circuit connected to each $x$ line of said $x$–$y$ matrix and one signal conditioning circuit connected to each $y$ line of said $x$–$y$ matrix; and, further including an $x$ encoder connected to the outputs of said $x$ signal conditioning circuits and a $y$ encoder connected to the outputs of said $y$ signal conditioning circuits.

15. A keyboard matrix as claimed in claim 14 including means for generating a strobe signal each time the position of a dome spring is changed with respect to its corresponding metallic target in said rapid manner.

16. A keyboard matrix as claimed in claim 15 wherein said means for generating a strobe signal comprises:
 a first OR gate connected to the $x$ lines of said matrix;
 a second OR gate connected to the $y$ lines of said matrix;
 an AND gate connected to the outputs of said OR gates; and,
 a multivibrator connected to the output of said AND gate.

17. A keyboard matrix as claimed in claim 12 and including means for sensing when the position of more than one of the dome springs of said plurality of electric signal devices have been simultaneously changed with respect to their corresponding metallic targets in said rapid manner.

18. A keyboard matrix as claimed in claim 17 wherein said means for sensing comprises:
 a first line resistively connected to the $x$ lines of said matrix and resistively connected to a voltage source;
 a first Schmitt trigger connected to said first line;
 a second line resistively connected to the $y$ lines of said matrix and resistively connected to a voltage source;
 a second Schmitt trigger connected to said second line;
 an OR gate connected to the outputs of said first and second Schmitt triggers;
 an error register connected to the output of said OR gate; and,
 means connected to said error register for resetting said error register.

19. A keyboard matrix as claimed in claim 12 wherein the segmented target of each of said plurality of electric signal devices has an electret material attached to the surface of the target nearest said dome spring.

20. A keyboard matrix as claimed in claim 19 wherein said matrix arrangement is a $x$–$y$ matrix having a plurality of $x$ and $y$ lines.

21. A keyboard matrix as claimed in claim 20 including a plurality of signal conditioning circuits, one signal conditioning circuit connected to each $x$ line of said $x$–$y$ matrix and one signal conditioning circuit connected to each $y$ line of said $x$–$y$ matrix; and, further including an $x$ encoder connected to the outputs of said $x$ signal conditioning circuits and a $y$ encoder connected to the outputs of said $y$ signal conditioning circuits.

22. A keyboard matrix as claimed in claim 21 including means for generating a strobe signal each time the position of a dome spring is changed with respect to its corresponding metallic target.

23. A keyboard matrix as claimed in claim 22 wherein said means for generating a strobe signal comprises:
 a first OR gate connected to the $x$ lines of said matrix;
 a second OR gate connected to the $y$ lines of said matrix;
 an AND gate connected to the outputs of said OR gates; and,
 a multivibrator connected to the output of said AND gate.

24. A keyboard matrix as claimed in claim 23 and including means for sensing when the position of more than one of the dome springs of said plurality of electric signal devices have been simultaneously changed with respect to their corresponding metallic targets in said rapid manner.

25. A keyboard matrix as claimed in claim 24 wherein said means for sensing comprises:
 a first line resistively connected to the $x$ lines of said matrix and resistively connected to a voltage source;
 a first Schmitt trigger connected to said first line;
 a second line resistively connected to the $y$ lines of said matrix and resistively connected to a voltage source;

a second Schmitt trigger connected to said second line;
an OR gate connected to the outputs of said first and second Schmitt triggers;
an error register connected to the output of said OR gate; and,
means connected to said error register for resetting said error register.

26. A capacitive electric signal device including:
a first substantially flat electrically conductive target plate;
a second curved resilient plate of electrically conductive material spaced from said target plate and supported along at least a portion of lateral edges thereof;
means providing a potential between said target and said plate, the center of said plate being deflectable from an original position toward said target plate to abruptly decrease the space therebetween when pressure is exerted against said center to change the capacitance therebetween to provide a first output signal, said center snapping back to said original position upon removal of the pressure; and
means for connecting said target plate and said curved plate to an electrical circuit responsive to said first output signal.

27. A capacitive electric signal device as claimed in claim 26 wherein said center snapping back to said original position produces a second output signal.

28. A capacitive electric signal device as claimed in claim 26 wherein said curved plate is dome-shaped and is supported about at least a portion of its peripheral edge.

29. A capacitive electric signal device as claimed in claim 28 wherein said target plate is circular and of smaller diameter than said dome-shaped plate.

30. A capacitive electric signal device as claimed in claim 26 wherein said potential providing means includes a layer of electret material coated on a side of said target adjacent said plate.

* * * * *